United States Patent [19]

Ishibashi et al.

[11] 4,166,746

[45] Sep. 4, 1979

[54] OPTICAL GLASS

[75] Inventors: Kazufumi Ishibashi, Sagamihara; Takeo Ichimura, Tokyo, both of Japan

[73] Assignee: Nippon Kogaku K.K., Tokyo, Japan

[21] Appl. No.: 916,263

[22] Filed: Jun. 16, 1978

Related U.S. Application Data

[63] Continuation of Ser. No. 742,246, Nov. 16, 1976, abandoned.

[51] Int. Cl.² .............................................. C03C 3/14
[52] U.S. Cl. .................................................. 106/47 Q
[58] Field of Search ...................................... 106/47 Q

[56] References Cited

U.S. PATENT DOCUMENTS

| 3,081,178 | 3/1963 | Weissenberg et al. | 106/47 Q |
| 3,958,999 | 5/1976 | Izumitani et al. | 106/47 Q |
| 3,960,579 | 6/1976 | Broemer et al. | 106/47 Q |

Primary Examiner—Richard E. Schafer
Assistant Examiner—Deborah L. Kyle
Attorney, Agent, or Firm—Shapiro and Shapiro

[57] ABSTRACT

A high refractive, low dispersive optical glass composition based on a $B_2O_3$-$La_2O_3$-$Y_2O_3$-$TiO_2$ quaternary system which is free of thorium oxide. The glass made of the composition has a refractive index of 1.79 to 1.93 and an Abbe number of 30 to 41.

4 Claims, No Drawings

OPTICAL GLASS

This is a continuation of application Ser. No. 742,246, filed Nov. 16, 1976, abandoned.

BACKGROUND OF THE INVENTION

1. Field of the Invention

This invention relates to an optical glass having a high refractive index and a low optical dispersion.

2. Description of the Prior Art

Most high refractive and low dispersive optical glass compositions hitherto known generally contain thorium oxide as a component to make them highly refractive and less dispersive. However, thorium is a radioactive element which is injurious to humans.

Optical glass having a high refractive index and a low optical dispersion, and which is free of thorium is known; for example, a $B_2O_3$-$La_2O_3$-$Y_2O_3$ ternary system. Such system, however, has a high liquifaction temperature, and therefore, has the disadvantage of devitrification. The tendency to devitrification does not allow any appreciable increase in the amount of $La_2O_3$ and $Y_2O_3$. As a result, it has been impossible to attain a stable supply of optical glasses having a high refractive index, and which are free of dangerous thorium.

SUMMARY OF THE INVENTION

Accordingly, it is a general object of the present invention to provide an optical glass which has a high refractive index and low optical dispersion, which is free of dangerous thorium, and which is stabilized with respect to devitrification. More specifically, a $B_2O_3$ $La_2O_3$-$Y_2O_3$-$TiO_2$ quaternary system is provided which is free of thorium, and which has a refractive index (nd) in the range of 1.79 to 1.93 and an Abbe number ($\nu$d) in the range of 30 to 41.

Other and further objects, advantages and improved results of the invention will appear more fully from the following description.

DESCRIPTION OF THE PREFERRED EMBODIMENTS

In contrast with the $B_2O_3$-$La_2O_3$-$Y_2O_3$ ternary system in the $B_2O_3$-$La_2O_3$-$Y_2O_3$-$TiO_2$ quaternary system of the invention there is present 2–19%, by weight, of $TiO_2$. Due to the presence of $TiO_2$ the liquifaction temperature of this system is substantially lower than that of the ternary system. As a result, the disadvantageous tendency to devitrification is reduced to a substantial extent coupled with an optical glass which has high refractive and low dispersive properties. Also, compared with the ternary system, the quaternary system of this invention provides a broader range of vitrification which, in turn, affords a correspondingly broadened range of refractive index.

As well known, $B_2O_3$ is a network-former of glass. $TiO_2$ is an ingredient which has the property of rendering glass highly refractive. By reducing the $B_2O_3$ content to the utmost extent in the presence of $TiO_2$, the glass becomes highly refractive. In fact, with the $B_2O_3$ $La_2O_3$-$Y_2O_3$-$TiO_2$ quaternary system of the invention, optical glasses are obtained having a refractive index (nd) in the range of 1.75 to 1.93 in a stable manner, whereas with a $B_2O_3$-$La_2O_3$-$Y_2O_3$ ternary system, only a refractive index (nd) in the range of 1.715 to 1.76 may be obtained.

With respect to dispersion, it is known that $TiO_2$ has the property of rendering glass highly dispersive. On the contrary, $Y_2O_3$ imparts low dispersion to the glass. It would be expected that if both of these ingredients are contained as main components in the glass composition, their effects would be to cancel each other out. According to the present invention, however, both the components $TiO_2$ and $Y_2O_3$ are compatibly used so that a glass having low optical dispersion is obtained coupled with high refractive index, and which is stabilized against devitrification.

As indicated above, $Y_2O_3$ has the property of rendering the glass of low dispersion. By increasing the $Y_2O_3$ content of glass a substantial amount, a low dispersive glass without any substantial decrease in Abbe number ($\nu$d) is obtained. Despite the presence of a substantial amount of $Y_2O_3$, there is no decrease in refractive index because neither $TiO_2$ nor $Y_2O_3$ affect this optical property of glass.

The $B_2O_3$-$La_2O_3$-$Y_2O_3$-$TiO_2$ system per se has, as a quaternary system, a broad range of vitrification as described above. The present invention, however, does not exclude the addition or inclusion of other ingredients. The optical glass according to the present invention may contain, in addition to the four components of the quaternary system, components selected from the group consisting of $GeO_2$, $ZrO_2$, $Ta_2O_5$, $Nb_2O_5$, $Gd_2O_3$, $WO_3$, $SiO_2$ and RO wherein RO is an ingredient or a combination of two or more ingredients such as MgO, CaO, SrO, BaO, ZnO, and PbO. These additional components generally affect the optical property of glass toward increasing the refractive index without any substantial decrease in Abbe number. Even when a comparatively large amount of these additional components is included in the composition, high refractive and low dispersive glasses are obtained in the same manner as with the simple quaternary system. Optical glasses containing the additional components also show good stability and are suitable for industrial scale production.

All of the optical glasses according to the present invention not only possess high refractive index and low dispersion, they also exhibit excellent chemical durability; $TiO_2$ imparts a good chemical durability to the glass. The excellent chemical durability makes polish processing of the glass very easy, and the reduced devitrifiability makes press works on glass easy also. The optical glass according to the present invention is superior to the prior art glasses with respect to chemical durability and workability.

To illustrate the present invention, the ranges of composition of glass are given below through first to sixth ranges of composition of the glass on a percent by weight basis:

(1) The first range of composition is as follows:

| | |
|---|---|
| $B_2O_3$ | 2–35 |
| $La_2O_3$ | 8–53 |
| $Y_2O_3$ | 2–29 |
| $TiO_2$ | 2–19 |
| $GeO_2$ | 0–31 |
| $ZrO_2$ | 0–8 |
| $Ta_2O_5$ | 0–37 |
| $Nb_2O_5$ | 0–21 |
| $Gd_2O_3$ | 0–24 |
| $WO_3$ | 0–16 |
| $SiO_2$ | 0–4 |
| RO | 0–24 |

RO has the same meaning as hereinbefore defined.

$B_2O_3$ below 2% makes glass devitrifiable and a content of $B_2O_3$ exceeding 35% causes the fused melt to separate into two liquid phases. Also, $La_2O_3$ below 8% brings forth the separation of the melt into two liquid phases. When the content of $La_2O_3$ exceeds 53%, the glass is apt to devitrify. $Y_2O_3$ below 2% or above 29% will make glass devitrifiable. Also, $TiO_2$ below 2% or above 19% will make glass devitrifiable. When $GeO_2$ exceeds 31%, the fusing point of the batch will increase and, therefore, there will be difficulty in fusing.

In case that $ZrO_2$, $Ta_2O_5$, $Nb_2O_5$, $Gd_2O_3$ and RO exceed 8%, 37%, 21%, 24% and 24%, respectively, the glass will become undesirably devitrifiable. $WO_3$ in excess of 16% will be apt to cause the fused melt to separate into two liquid phases. A content of $SiO_2$ in excess of 4% is unsuitable. On melting, $SiO_2$ remains unmelted and a longer time will be required to fuse the batch completely.

(2) By further limiting the contents of $B_2O_3$, $Y_2O_3$, $TiO_2$ and $GeO_2$ as specified below, a second range of composition is obtained which enables the production of an optical glass having improved stability against devitrification than the first composition. As to the remaining components not specified below, the first range of composition may be applied.

| | |
|---|---|
| $B_2O_3$ | 2–18 |
| $Y_2O_3$ | 2–14 |
| $TiO_2$ | 2– 8 |
| $GeO_2$ | 9–31 |

(3) By further limiting the second range of composition to the extent shown below, a composition is obtained which enables the production of an optical glass which is more resistive to devitrification than the second composition. As to the remaining components not specified below, the second range of composition may be applied.

| | |
|---|---|
| $La_2O_3$ | 8–39 |
| $Y_2O_3$ | 2–12 |
| $TiO_2$ | 2– 7 |
| $Ta_2O_5$ | 7–37 |

(4) By further limiting the third range of composition to the extent shown below, a composition is obtained which enables the production of an optical glass having a better stability against devitrification than the third composition. As to the remaining components not specified below, the third range of composition may be applied.

| | |
|---|---|
| $GeO_2$ | 11–31 |
| $Ta_2O_5$ | 8–37 |
| $ZrO_2$ | 1–8 |
| $Nb_2O_5$ | 0 |
| RO | 0–5 |

(5) By further limiting the fourth range of composition to the extent shown below, a composition is obtained which enables the production of an optical glass which is even more resistive to devitrification than the fourth composition.

| | |
|---|---|
| $La_2O_3$ | 27–39 |
| $Ta_2O_5$ | 11–37 |
| $Gd_2O_3$ | 0 |
| $WO_3$ | 0 |

(6) By further limiting the fifth range of composition to the extent specified below, a composition is obtained which enables the production of an optical glass having even further improved stability against devitrification as compared to the fifth composition. As to the remaining components, the fifth range of composition may be applied.

| | |
|---|---|
| $Y_2O_3$ | 2–10 |
| $SiO_2$ | 0 |
| RO | 0 |

The optical glass according to the present invention can be produced in the following manner:

As starting materials of the glass components, the corresponding oxides, carbonates, nitrates or the like are used. Each of the materials is weighed to give a correct component ratio as desired. The weighed starting materials are thoroughly mixed to form a glass batch. The prepared batch is charged into a platinum crucible in an electric furnace heated to a temperature of 1200° to 1400° C. After fusing and refining, the molten glass is stirred and homogenized. Then, the molten glass is cast into an iron mold and annealed to form glass.

A number of examples of the optical glass according to the invention are given in the following table with data of composition (percent by weight), refractive index (nd) and Abbe number (νd):

Table

| | 1 | 2 | 3 | 4 | 5 | 6 | 7 | 8 | 9 | 10 |
|---|---|---|---|---|---|---|---|---|---|---|
| $B_2O_3$ | 24.72 | 34.75 | 23.78 | 30.46 | 29.29 | 16.40 | 15.82 | 15.45 | 14.42 | 13.87 |
| $La_2O_3$ | 38.56 | 27.10 | 49.46 | 38.87 | 49.85 | 52.94 | 46.67 | 32.55 | 27.51 | 32.70 |
| $Y_2O_3$ | 17.81 | 28.18 | 8.57 | 17.96 | 8.64 | 3.26 | 13.78 | 8.64 | 4.45 | 4.96 |
| $TiO_2$ | 18.91 | 9.97 | 18.19 | 12.71 | 12.22 | 7.89 | 4.92 | 4.22 | 2.97 | 4.13 |
| $GeO_2$ | — | — | — | — | — | 19.51 | 18.81 | 19.67 | 11.85 | 16.50 |
| $ZrO_2$ | — | — | — | — | — | — | — | 7.94 | 1.84 | — |
| $Ta_2O_2$ | — | — | — | — | — | — | — | 11.63 | 36.96 | 7.72 |
| $Nb_2O_3$ | — | — | — | — | — | — | — | — | — | 20.12 |
| $n^d$ | 1.9034 | 1.7954 | 1.9134 | 1.8407 | 1.8481 | 1.8653 | 1.8499 | 1.8638 | 1.8378 | 1.8790 |
| $\nu^d$ | 30.9 | 39.8 | 30.8 | 35.9 | 35.3 | 37.2 | 40.3 | 37.4 | 33.9 | 30.3 |

| | 11 | 12 | 13 | 14 | 15 | 16 | 17 | 18 |
|---|---|---|---|---|---|---|---|---|
| $B_2O_3$ | 16.02 | 2.69 | 14.40 | 17.19 | 14.44 | 12.70 | 13.53 | 14.59 |
| $La_2O_3$ | 33.02 | 36.23 | 8.34 | 38.24 | 34.04 | 35.33 | 37.91 | 32.88 |
| $Y_2O_3$ | 5.73 | 9.27 | 10.32 | 2.32 | 5.16 | 7.94 | 9.70 | 11.13 |
| $TiO_2$ | 2.44 | 3.08 | 6.05 | 6.96 | 4.30 | 3.36 | 3.22 | 3.99 |
| $GeO_2$ | 9.91 | 30.75 | 17.12 | 16.70 | 17.17 | 13.41 | 16.09 | 18.48 |
| $ZrO_2$ | — | 2.99 | 3.33 | 3.96 | 1.62 | 2.08 | 3.13 | 4.25 |

Table-continued

| | | | | | | | | |
|---|---|---|---|---|---|---|---|---|
| $Ta_2O_3$ | 8.92 | 14.99 | 16.70 | 14.63 | 8.04 | 16.35 | 15.69 | 13.89 |
| $Gd_2O_3$ | — | — | 23.74 | — | — | — | — | — |
| $WO_3$ | — | — | — | — | 15.23 | — | — | — |
| $SiO_2$ | — | — | — | — | — | 3.85 | — | — |
| MgO | 1.47 | — | — | — | — | — | — | — |
| CaO | 2.04 | — | — | — | — | — | — | — |
| SrO | 3.77 | — | — | — | — | — | — | — |
| BaO | 5.59 | — | — | — | — | 4.92 | 0.73 | 0.79 |
| ZnO | 2.96 | — | — | — | — | — | — | — |
| PbO | 8.13 | — | — | — | — | — | — | — |
| $n^d$ | 1.8317 | 1.9275 | 1.8773 | 1.8731 | 1.8701 | 1.8507 | 1.8757 | 1.8639 |
| $v^d$ | 38.0 | 35.2 | 34.8 | 34.8 | 34.3 | 38.3 | 38.0 | 37.7 |

From the foregoing, it will be understood that according to the present invention, high refractive and low dispersive optical glass in particular an optical glass having a refractive index (nd) in the range of 1.79 to 1.93 and an Abbe number (vd) in the range of 30 to 41 can be produced in a stable and industrial manner.

It is believed that the advantages and proved results furnished by the optical glass of the invention will be apparent from the foregoing description of the preferred embodiments of the invention. Various changes and modifications may be made without departing from the spirit and scope of the invention as sought to be defined in the following claims.

We claim:

1. A thorium-free composition for optical glass having a refractive index of about 1.83 to 1.93 and Abbe number of about 33 to 39 consisting essentially of, on a percent by weight basis, $B_2O_3$ 2-18; $La_2O_3$ 27-39; $Y_2O_3$ 2-12; $TiO_2$ 2-7; $GeO_2$ 11-31; $ZrO_2$ 1-8; $Ta_2O_5$ 11-37; $SiO_2$ 0-4; and BaO 0-5.

2. A thorium-free composition for optical glass according to claim 1, wherein $Y_2O_3$ 2-10; $SiO_2$ 0; and Ba 0.

3. A thorium-free composition for optical glass according to claim 1, wherein $B_2O_3$ 13.53; $La_2O_3$ 37.91; $Y_2O_3$ 9.70; $TiO_2$ 3.22; $GeO_2$ 16.09; $Ta_2O_5$ 15.69; $ZrO_2$ 3.13; $SiO_2$ O; and BaO 0.73.

4. A thorium-free composition for optical glass according to claim 1, wherein $B_2O_3$ 14.59; $La_2O_3$ 32.88; $Y_2O_3$ 11.13; $TiO_2$ 3.99; $GeO_2$ 18.48; $Ta_2O_5$ 13.89; $ZrO_2$ 4.25; $SiO_2$ 0; and BaO 0.79.

* * * * *